Patented Aug. 11, 1953

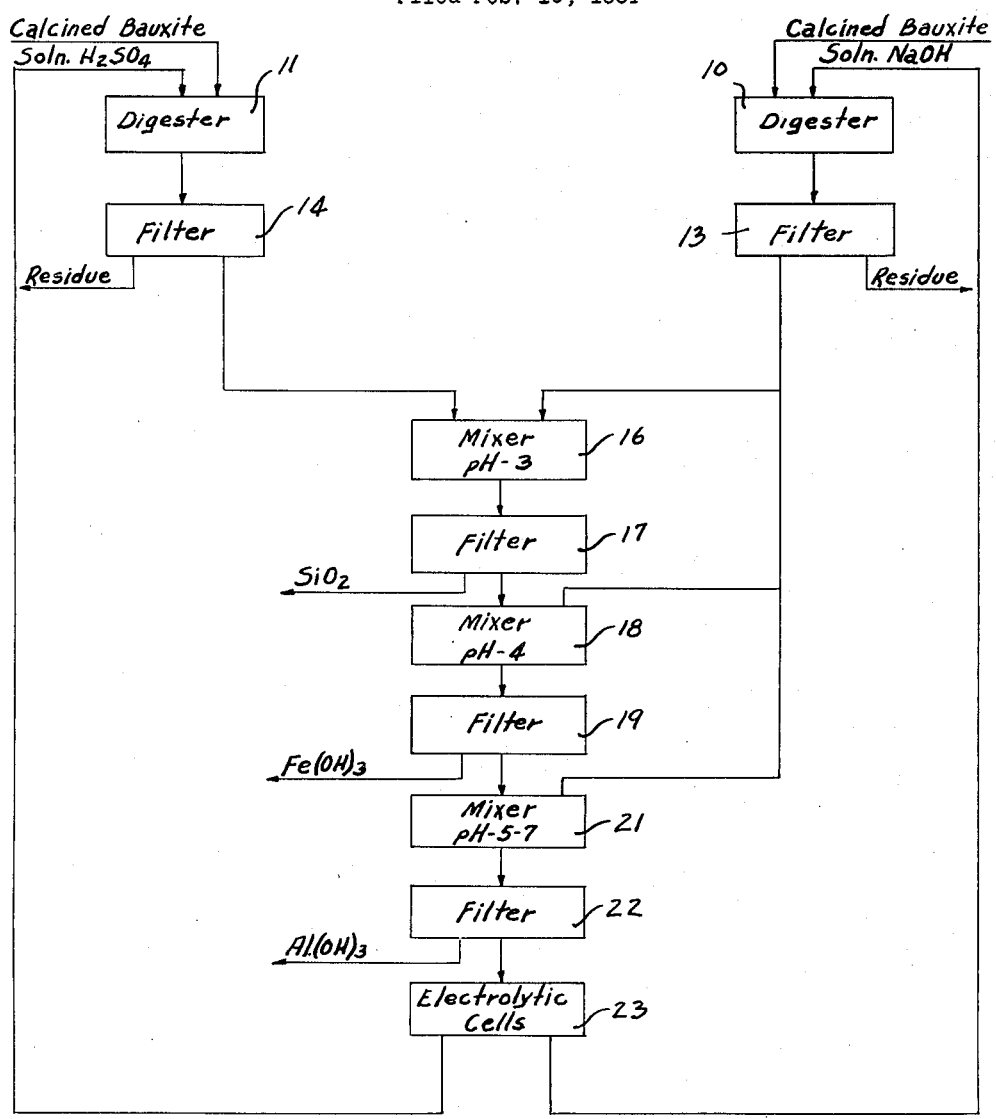

2,648,595

UNITED STATES PATENT OFFICE 2,648,595

CYCLIC PROCESS FOR TREATING ALUMINOUS ORES

Absalom M. Kennedy, Tuscaloosa, Ala.

Application February 10, 1951, Serial No. 210,370

11 Claims. (Cl. 23—143)

This invention relates to a cyclic process for treating aluminous ores and has for its principal object the provision of such a process which shall economically produce alumina from impure or low grade aluminous ores and residues such as silicious bauxite, kaolinite, blast furnace slags and the like.

A further object is to provide a process of the character designated in which the chemical agents used for separating the aluminum oxide from the ore are regenerated and reused, thereby expanding only the ore and electrical power.

A further object is to provide a process of the character designated in which a minimum of electrical energy is used for the recovery of the aluminous content of the ore.

The low silica bauxite deposits of the United States have practically been exhausted. It is, therefore, very important that other methods be devised for recovering alumina from low grade or silicious bauxite deposits which usually contain varying amounts of silicon as $SiO_2$, iron as $Fe_2O_3$ and titanium as $TiO_2$.

Heretofore in the art to which my invention relates, alumina has been generally obtained from high grade or low silica bauxite by the Bayer process which comprises digesting the bauxite with a hot, fairly concentrated solution of sodium hydroxide under pressure. The greater portion of the aluminum content of the ore is dissolved forming a solution of sodium aluminate. This is separated from the insolubles known as red mud. On diluting and cooling the solution the greater part of its aluminum content is precipitated as hydrated aluminum oxide which is separated by filtration, washed, dried and heated to form an aluminum oxide with sufficiently low iron and silicon content to make it useful for the commercial production of aluminum metal by the well known Hall process. For each pound of silica ($SiO_2$) in the bauxite, approximately a pound of alumina and a pound of sodium hydroxide are lost through the forming of an insoluble sodium aluminum silicate which remains in the residual red mud. This process is, therefore, economically useful only with high grade bauxite ore having a low silica content.

Another process that has been proposed is the process disclosed in McCullough Patent No. 2,120,840, in which the alunite is treated with sulphuric acid and potassium hydroxide to recover alumina and potassium sulphate. According to the teachings of the McCullough patent one mole of $Al_2O_3$, which simple Formula I shall take to represent the bauxite, reacts with three moles of sulphuric acid to produce aluminum sulphate. The resulting aluminum sulphate then reacts with an excess of alkali hydroxide to produce alkali aluminate. The alkali aluminate then reacts with one mole of sulphuric acid to produce two moles of aluminum hydroxide. By heating the aluminum hydroxide one mole of aluminum oxide is produced. As will be seen from the teachings of McCullough, to free one mole of alumina from the bauxite and recover it as one mole of pure $Al_2O_3$ requires 4 moles of sulfuric acid and 8 moles of sodium hydroxide which are produced by the decomposition of 4 moles of sodium sulphate in electrolytic cells with an expenditure of 8 Faradays or 214.4 ampere hours of electric current.

I have devised a process whereby 3 moles of sulphuric acid and 6 moles of sodium hydroxide are utilized to produce 4 moles of alumina and 3 moles of sodium sulphate. The sodium sulphate thus produced is electrolyzed by 6 Faradays to reproduce 3 moles of sulphuric acid and 6 moles of sodium hydroxide which is reused in the process, thus greatly reducing the amount of electric current required.

Briefly, my process comprises an acid extraction of the aluminum and a portion of the iron contents of one batch of ore and an alkali extraction of the aluminum and a portion of the silicon contents of a second batch of ore. The resultant solutions are then mixed and the iron and silicon constituents thereof are removed by filtration, leaving a solution containing aluminum as a sulphate. The aluminum content is then precipitated and separated as aluminum hydroxide. The residual solution is then electrolyzed in suitable cells to recover the acid and alkali for reuse with fresh batches of ore.

In the accompanying drawing, forming a part of this application, the single figure is a flow sheet of my process for treating aluminous ores.

Referring to the drawing my improved process comprises crushing the ore to approximately 80 mesh and roasting or calcining it to remove moisture and organic matter and to open up the particles so as to facilitate subsequent chemical reactions. After analysis, by the usual chemical calculations to determine the proportions of the ore to be handled by each treatment, the calcined ore is divided into two portions. One portion is treated in a digester 10 with a solution of an alkali metal hydroxide such as sodium hydroxide or potassium hydroxide, the proportion of the ore to the alkali being such that the alumina content of the ore is converted into sodium aluminate. While not essential, the temperature of the solution should be from 80° to 90° C. in order to hasten the reaction. Also, the hot mixture of ore and alkali in the digester should be well agitated. The other portion of the ore is treated in a digester 11 with a solution of sulphuric acid, the proportion of the ore to the acid being such that the alumina content of the ore is converted into aluminum sulphate. The temperature of the solution is also preferable maintained at a temperature of from 80° to 90° C. to hasten the reaction and the hot mixture is well agitated until the reaction is substantially completed.

The result of the reaction which occurs in digester 10 is to extract the greater part of the alumium content of the ore as sodium aluminate ($NaAlO_2$) and a small portion of the silica content of the ore as sodium silicate. The iron, titanium and the greater part of the silicon content of the ore are not reacted on and remain as insolubles. The precipitate of these insolubles is separated from the solution by filtering the solution through a filter 13 and washing the precipitate with a limited quantity of water, the resultant wash being added to the filtrate.

The result of the reaction which occurs in digester 11 is that the sulphuric acid dissolves most of the aluminum and a small portion of the iron content of the ore and forms an acid solution of aluminum and ferric sulphates. The silicon, titanium and the greater part of the iron content of the ore remain as insolubles. The precipitate is separated from the solution by filtering the solution through a filter 14 and washing the precipitate with a limited amount of water. The resultant wash is added to the filtrate.

A portion of the alkaline filtrate from filter 13 is carefully mixed, in a mixer 16, with the acid filtrate from filter 14 so that there is a uniform change in the hydrogen ion concentration, or pH value, throughout the mixture. This may be accomplished by supplying the solution from filter 13 through a large number of orifices, or diffusion nozzles, not shown, to the filtrate from the filter 14 while agitating the mixture.

The addition of the filtrate from filter 13 is stopped when most of its silica content has been precipitated and before the precipitation of any considerable amount of the iron content of the filtrate from the filter 14. At this point the combined solutions should have a pH value of approximately 3. The agitation of the mixture is stopped and the mixture is allowed to remain quiet until the precipitate has settled. As it requires approximately an hour or more for the precipitate to settle, a settling tank may be employed for this purpose if desired. The silica precipitate is then separated from the solution by filtering the solution through a filter 17.

To the filtrate from filter 17 is carefully added, in a mixer 18 and in the manner described above, more of the filtrate from the filter 13. This filtrate is added until the iron content of the combined solutions is precipitated as ferric hydroxide unaccompanied by any substantial amount of aluminum hydroxide, which precipitation occurs at a pH of about 4. The agitation is stopped and the precipitate of ferric hydroxide is then separated from the solution by passing the solution through a filter 19.

To the resulting filtrate from the filter 19 is added, in a mixer 21, more of the filtrate from filter 13 until the aluminum content is precipitated as aluminum hydroxide. At this point the pH value of the solution is from 5 to 7. The aluminum hydroxide precipitate is allowed to settle and is separated from the solution, which consists essentially of sodium sulphate, by passing the solution through a filter 22. The aluminum hydroxide is then washed and dried in the usual manner and may be heated, as in a kiln, to produce alumina.

The solution of sodium sulphate is conveyed to divided electrolytic cells 23 where an electric current separates the solution of sodium sulphate into a solution of sulphuric acid, as the anodic product, and a solution of sodium hydroxide, as the cathodic product. The reaction may be represented as:

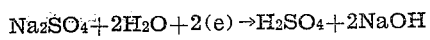

$$Na_2SO_4 + 2H_2O + 2(e) \rightarrow H_2SO_4 + 2NaOH$$

The resulting solutions are then used to react with fresh batches of bauxite. It will be seen that the only expenditure of chemicals, as of sodium hydroxide, sulphuric acid, or of sodium sulphate will be that due to unavoidable mechanical losses.

From the foregoing, it will be apparent that modifications of the steps of my process may be made. For example, sufficient alkaline solution from filter 13 may be added to the acid solution from filter 14 to precipitate both the silicon and iron content of the combined solutions as hydrated silica and ferric hydroxide, care being taken to stop the addition of the alkaline solution when the precipitation of these contents is complete and before the aluminum content is precipitated as aluminum hydroxide. This procedure would eliminate a mixing, a filtering and a washing operation in the process. An additional feature of this procedure would be a more complete separation of the silicon content of the solution as the hydrated silica in colloidal form, which is not readily separated by filtration, is carried down by the ferric hydroxide as it forms flocs or larger masses in precipitation.

From the foregoing it will also be seen that by using a minimum of electrical energy for recovering the aluminous content of the ore, I have provided a process which produces alumina economically from impure or low grade ores and residues. In accordance with other processes, known to me, it requires approximately 8 Faradays or 214.4 ampere hours to liberate and reproduce 1 mole of $Al_2O_3$. To liberate and reproduce the same quantity of $Al_2O_3$ according to my invention only 1½ Faradays or 40.2 ampere hours is required, the ratio of current expenditure for the same result being 16:3.

While I have shown my invention in but two forms, it will be obvious to those skilled in the art that it is not so limited, but is susceptible of various other changes and modifications without departing from the spirit thereof, and I desire, therefore, that only such limitations shall be placed thereupon as are specifically set forth in the appended claims.

What I claim is:

1. The method of producing alumina from aluminous ores containing iron and silicon comprising the steps of treating a portion of the ore with a solution of an alkali metal hydroxide, the proportion of the ore to the alkali being sufficient to convert the alumina content of the ore into an alkali metal aluminate, separating the insolubles of the mixture from the alkali aluminate extract solution, treating a second portion of the ore with a solution of sulphuric acid, the proportion of the ore to the acid being sufficient to convert the alumina content of the ore into aluminum sulphate, separating the insolubles of the mixture from the acid solution, adding to said acid solution a sufficient quantity of said alkali aluminate extract solution to precipitate most of its silica content, separating said precipitate of silica from the acid solution, adding to said last mentioned acid solution a sufficient quantity of the alkali aluminate extract solution to precipitate the iron content of the combined solutions and an insufficient quantity of said alkali aluminate extract solution to precipitate any substantial amount of aluminum hydroxide, separating the iron precipitate from the acid solution, adding to the last mentioned acid solution a sufficient quantity of the alkali aluminate extract solution to precipitate the aluminum content thereof as aluminum hydroxide, and separating the aluminum hydroxide precipitate from the solution.

2. The method of producing alumina from aluminous ores containing iron and silicon as defined in claim 1 in which the alkali metal hydroxide used is sodium hydroxide.

3. The method of producing alumina from aluminous ores containing iron and silicon as defined in claim 1 in which the alkali metal hydroxide used is potassium hydroxide.

4. The method of producing alumina from aluminous ores containing iron and silicon as defined in claim 1 in which the sulphuric acid and alkali metal hydroxide solutions are maintained at a temperature of from 80° to 90° C.

5. The process of treating aluminous ores containing iron and silicon comprising the steps of calcining the ore to be treated, treating a portion of the calcined ore with a solution of sodium hydroxide, the proportion of the ore to the alkali being sufficient to convert the alumina content of the ore into sodium aluminate, separating the sodium aluminate extract solution from the insolubles of the mixture, treating a second portion of the calcined ore with a solution of sulphuric acid, the proportion of the ore to the acid being sufficient to convert the alumina content of the ore into aluminum sulphate, separating the acid solution from the insolubles of the mixture, bringing together said acid solution with a sufficient quantity of said sodium aluminate extract solution to precipitate most of its silica content, separating said precipitate of silica from the acid solution, adding to said last mentioned acid solution a sufficient quantity of the sodium aluminate extract solution to precipitate the iron content of the acid solution and an insufficient quantity of said sodium aluminate extract solution to precipitate any substantial amount of the aluminum content of the solution, separating the iron precipitate from the acid solution, adding to said last mentioned acid solution a sufficient quantity of said sodium aluminate extract solution to precipitate the aluminum content thereof as aluminum hydroxide thus leaving a residual solution of an alkali metal sulphate, separating the aluminum hydroxide precipitate from the solution, washing and drying the aluminum hydroxide to produce alumina, and separating electrically the sodium sulphate into sodium hydroxide and sulphuric acid for reuse with fresh batches of calcined ore.

6. The process of treating aluminous ores containing iron and silicon comprising steps of, treating a portion of the ore with a solution of an alkali metal hydroxide, the proportion of the ore to the alkali being sufficient to convert the alumina content of the ore into an alkali metal aluminate, separating the insolubles of the alkali aluminate extract solution, treating a second portion of the ore with a solution of sulphuric acid, the proportion of the ore to the acid being sufficient to convert the alumina content of the ore into aluminum sulphate, separating the insolubles of the acid mixture from the acid solution, bringing together said acid solution with a sufficient quantity of said alkali aluminate extract solution to precipitate both the silicon and the iron content of the acid solution, separating the iron and silica precipitate from said acid solution, adding to said last mentioned acid solution a sufficient quantity of the aluminate extract solution to precipitate the aluminum content thereof as aluminum hydroxide, and separating the aluminum hydroxide precipitate from the solution.

7. The process of treating aluminous ores containing iron and silicon comprising the steps of, treating a portion of the ore with a solution of an alkali metal hydroxide, the proportion of the ore to the alkali being sufficient to convert the alumina content of the ore into an alkali metal aluminate, separating the insolubles of the mixture from the alkali aluminate extract solution, treating a second portion of the ore with a solution of sulphuric acid, the proportion of the ore to the acid being sufficient to convert the alumina content of the ore into aluminum sulphate, separating the insolubles of the mixture from the acid solution, adding to said acid solution a sufficient quantity of said alkali aluminate extract solution to raise the pH of the solution to approximately 3, filtering the acid solution to remove insolubles therefrom thus removing the silicon content from the solution, adding to the acid solution having a pH of approximately 3 a sufficient quantity of the alkali aluminate extract solution to raise the pH thereof to approximately 4, filtering said last mentioned acid solution to remove the insolubles therefrom thus removing the iron content from the solution, adding to said solution having a pH of approximately 4 a sufficient quantity of the alkali aluminate extract solution to raise the pH of the solution to from 5–7, and filtering said last mentioned solution to remove the insolubles therefrom thus removing aluminum hydroxide, and leaving a residual solution which consists essentially of an alkali metal sulphate.

8. The process for treating aluminous ores as defined in claim 7 which includes the further step of separating electrically the solution consisting essentially of an alkali metal sulphate into a solution of alkali metal hydroxide and sulphuric acid.

9. The process for treating aluminous ores as defined in claim 7 in which the alkali metal hydroxide used is sodium hydroxide.

10. The process for treating aluminous ores as defined in claim 7 in which the alkali metal hydroxide used is potassium hydroxide.

11. The process of treating aluminum ore containing iron and silicon comprising the steps of, extracting from a batch of said ore with sulphuric acid the aluminum and a portion of the iron contents thereof, extracting from a second batch of said ore with an alkali metal hydroxide the aluminum and a portion of the silicon content thereof, adding to the resultant solution from the acid extraction a quantity of the resultant solution from the alkali metal hydroxide extraction to separate therefrom the iron and silicon contents, thus leaving a solution of aluminum sulphate, adding to the aluminum sulphate solution a sufficient quantity of the resultant solution from said alkali metal hydroxide extraction to precipitate the aluminum content thereof as aluminum hydroxide, separating said aluminum hydroxide precipitate from the solution and drying the aluminum hydroxide to produce alumina.

ABSALOM M. KENNEDY.

References Cited in the file of this patent

UNITED STATES PATENTS

| Number | Name | Date |
| --- | --- | --- |
| 455,611 | Emanuel | July 7, 1891 |
| 1,858,165 | McAdoo | May 10, 1932 |
| 1,918,735 | Bradley | July 18, 1935 |
| 2,120,840 | McCullough | June 14, 1938 |
| 2,487,076 | Sharp et al. | Nov. 8, 1949 |